United States Patent
Lee et al.

(10) Patent No.: US 8,942,010 B2
(45) Date of Patent: Jan. 27, 2015

(54) INVERTER OF NEW AND RENEWABLE ENERGY STORAGE SYSTEM

(75) Inventors: Woogyoung Lee, Yongin-si (KR); Namsung Jung, Yongin-si (KR); Jungpil Park, Yongin-si (KR); Sungsoo Hong, Yongin-si (KR); Chungwook Roh, Yongin-si (KR); Sangkyoo Han, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 553 days.

(21) Appl. No.: 12/929,821

(22) Filed: Feb. 17, 2011

(65) Prior Publication Data
US 2011/0299303 A1    Dec. 8, 2011

(30) Foreign Application Priority Data
Jun. 7, 2010  (KR) .......................... 10-2010-0053427

(51) Int. Cl.
*H02M 3/335*  (2006.01)
*H02J 3/38*  (2006.01)

(52) U.S. Cl.
CPC . *H02J 3/385* (2013.01); *Y02E 10/58* (2013.01)
USPC ........................................ 363/17; 363/21.02

(58) Field of Classification Search
USPC ................................................ 363/17, 21.02
See application file for complete search history.

(56) References Cited

U.S. PATENT DOCUMENTS

| | | | |
|---|---|---|---|
| 6,344,979 B1 | 2/2002 | Huang et al. | |
| 2005/0270000 A1 | 12/2005 | Chang et al. | |
| 2008/0055941 A1* | 3/2008 | Victor et al. | 363/17 |
| 2008/0143188 A1* | 6/2008 | Adest et al. | 307/82 |
| 2009/0244929 A1 | 10/2009 | Fornage | |
| 2009/0244933 A1 | 10/2009 | Wang et al. | |
| 2010/0164400 A1* | 7/2010 | Adragna | 315/294 |
| 2010/0244575 A1* | 9/2010 | Coccia et al. | 307/82 |

FOREIGN PATENT DOCUMENTS

| | | |
|---|---|---|
| JP | 08-171430 A | 7/1996 |
| JP | 2009-254227 A | 10/2009 |
| KR | 10 2008-0005687 A | 1/2008 |
| KR | 10-0790709 B1 | 1/2008 |

OTHER PUBLICATIONS

Oh, et al.; High Efficiency DC-DC Converter for Fuel Cell System; KIEE, Dec. 2009; pp. 2410-2415; vol. 58, No. 12; Republic of Korea.
Korean Notice of Allowance in KR 10-2010-0053427, dated Jan. 16, 2012 (Lee, et al.).

* cited by examiner

*Primary Examiner* — Jue Zhang
(74) *Attorney, Agent, or Firm* — Lee & Morse, P.C.

(57) ABSTRACT

Provided is an inverter of a renewable energy storage system, which has an input port and an output port electrically insulated, and is compact and low-priced, while having a simplified circuit. The inverter includes a DC-DC converting unit connected to the DC link, and an inverting unit connected between the DC-DC converting unit and the power system, wherein the DC-DC converting unit is an unregulated DC-DC bus converter.

16 Claims, 6 Drawing Sheets

INVERTER OF NEW AND RENEWABLE ENERGY STORAGE SYSTEM

BACKGROUND

1. Field

Embodiments relate to an inverter of a new and renewable energy storage system.

2. Description of the Related Art

In general, a renewable energy storage system, such as a solar cell based system or a wind power generator based system, includes a plurality of converters and a plurality of inverters for storing generated energy in various levels of alternating current (AC) or direct current (DC) power. Renewable energy storage systems use a DC-to-AC inverting unit to convert DC power generated renewably, e.g., by a solar cell, to AC power that is provided to an electric power system. Further, since the power generated by a solar cell has a different power level (e.g., voltage level) from that of a battery, a DC-to-DC converter is used to change the power generated by the solar cell to the power having a voltage level suitably provided to the battery.

Most of existing inverters are not provided with a transformer. Thus, insulation is not currently taken into consideration in mainstream inverters. However, as in most electrical devices, insulation between input and output ports is required for an inverter used in a new and renewable energy storage system. There are many methods of insulating the inverter used in a new and renewable energy storage system. However, in conventional insulating methods, the inverter may become bulky and costly and the circuit thereof may become complicated.

SUMMARY

Embodiments are directed to an inverter of a new and renewable energy storage system, which represents and advance in the related art.

It is a feature of an embodiment to provide an inverter of a new and renewable energy storage system having an input port and an output port that are electrically insulated.

It is another feature of an embodiment to provide an inverter of a new and renewable energy storage system that is compact.

It is a yet another feature of an embodiment to provide an inverter that is low-priced.

It is a still another feature of an embodiment to provide an inverter having a simplified circuit.

At least one of the above and other features and advantages may be realized by providing an inverter of a renewable energy storage system including a DC-DC converting unit connected to the DC link, and an inverting unit connected between the DC-DC converting unit and the power system, wherein the DC-DC converting unit is an unregulated DC-DC bus converter.

The DC-DC converting unit may operate with a fixed duty cycle of 50%.

The DC-DC converting unit may include a half-bridge switch that outputs power of the DC link with a fixed duty cycle, an oscillator that oscillates the power output from the half-bridge switch, a transformer that converts the power from the oscillator into power of a different level and outputs the converted power, and a full-bridge diode rectifier that rectifies the power output from the transformer into DC power and outputs the rectified power.

The half-bridge switch may include a first switch connected to a first electrode of the DC link, and a second switch connected to the first switch and a second electrode of the DC link.

The oscillator may include an input capacitor connected to the half-bridge switch, a first inductor connected to the input capacitor, and a second inductor connected to first inductor and the DC link.

The transformer may include a primary turn connected in parallel to the second inductor, and a secondary turn insulated from the primary turn.

The inverter may be a full-bridge switch connected to the DC-DC converting unit.

The new renewable energy may be electric energy produced from a solar cell, a wind power generator, or a tidal power generator.

An inverter of a renewable energy storage system according to the above described embodiments of the present invention employs an insulating transformer, thereby allowing an input port and an output port to be electrically insulated.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
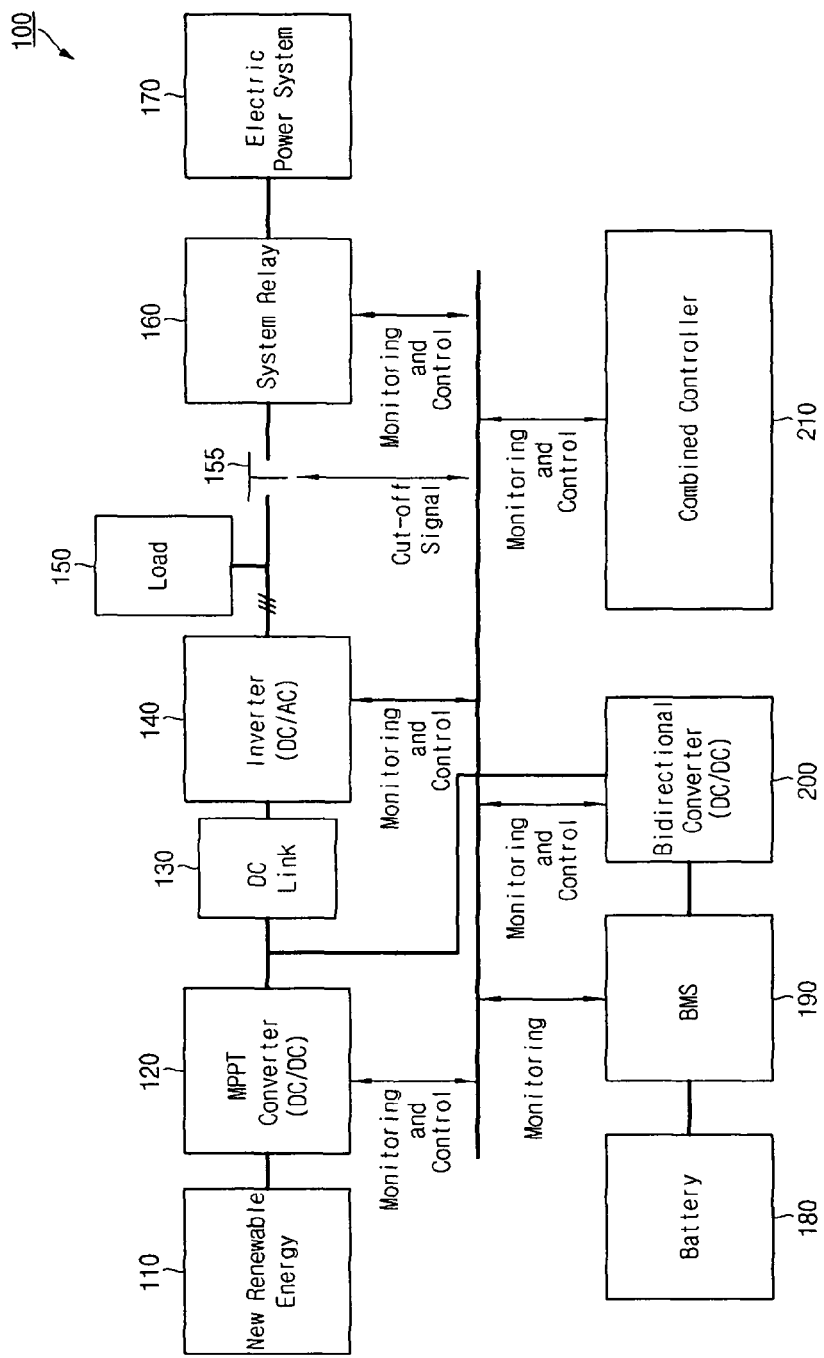
FIG. 1 illustrates a schematic block diagram of a renewable energy storage system according to an embodiment.

Korean Patent Application No. 10-2010-0053427, filed on Jun. 7, 2010, in the Korean Intellectual Property Office, and entitled: "Inverter of New and Renewable Energy Storage System," is incorporated by reference herein in its entirety.

Example embodiments will now be described more fully hereinafter with reference to the accompanying drawings; these embodiments are provided so that this disclosure will be thorough and complete, and will fully convey the scope of the invention to those skilled in the art.

Throughout the specification, like reference numerals refer to the like elements. In the drawings, the thickness of layers and regions may be exaggerated for clarity. Further, when it is stated herein that one part is "connected" to another part, the one part may be directly connected to the other part, or the one part and the other part may be electrically connected at respective sides of another device or conductive element.

FIG. 1 illustrates a schematic block diagram of a renewable energy storage system 100 according to an embodiment. As shown in FIG. 1, the renewable energy storage system 100 according to an embodiment may include a new renewable energy 110, a maximum power point tracking (hereinafter "MPPT") converter 120, a direct current (DC) link 130, an inverter 140, a load 150, a system relay 160, an electric power system 170, a battery 180, a battery monitoring system 190, a bidirectional converter 200, and a combined controller 210.

The new renewable energy 110 refers to energy generated from renewable energy sources, e.g., solar, wind, water, ground heat, or the like. More specifically, the new renewable energy 110 may be electric energy produced from a solar cell, a wind power generator, a tidal power generator, a geothermal generator, and equivalents thereof. In the following description, embodiments will be described with regard to a solar cell as a source of the new renewable energy 110.

The MPPT converter 120 extracts maximum available power from the new renewable energy 110, converts the same into DC power of a different level, and then outputs the converted power. For example, power of a solar cell non-linearly varies with solar radiation and surface temperature of the solar cell. Such fluctuations may be a primary cause of decreasing the generation efficiency of the solar cell. The MPPT converter 120 makes the solar cell operate at the maximum power point all the time. In addition, the DC power extracted at the maximum power point is converted into DC power of a different level to then be supplied to the DC link 130.

The DC link 130 temporarily stores the DC power supplied from the MPPT converter 120. The DC link 130 may be substantially a large-capacity capacitor. Accordingly, the DC link 130 eliminates AC components from the DC power output from the MPPT converter 120 and stores stable DC power.

The inverter 140 converts the DC power supplied from the DC link 130 into common AC power and outputs the converted power. In practice, the inverter 140 converts the DC power supplied from the new renewable energy 110 or the battery 180 into a common AC voltage that can be used by a load 150. The inverter 140 may convert the DC voltage supplied from the new renewable energy 110 or the battery 180 into an AC voltage and may supply the same to the electric power system 170. The inverter 140 will later be described in more detail.

The load 150 may be a home or industrial facility using the common AC voltage. The load 150 receives the common AC voltage from the new renewable energy 110, the battery 180, or the electric power system 170.

The system relay 160 connects the inverter 140 to the power system 170. For example, the system relay 160 may adjust a voltage variation range, suppress harmonic waves, and eliminate DC components to then supply AC power of the inverter 140 to the electric power system 170 or AC power of the electric power system 170 to the inverter 140.

The electric power system 170 is an AC power system supplied from an electricity company or a power generation company. For example, the electric power system 170 is an electric interconnection formed over a wide area including a power generation station, a transformer substation, and a power transmission site, and is generally called a grid.

The battery 180 may be secondary battery capable of charging and discharging. For example, the battery 180 may include, but is not limited to, a lithium ion battery, a lithium polymer battery, and equivalents thereof.

The battery monitoring system 190 maintains and manages the battery 180 to be kept at the optimum state. For example, the battery monitoring system 190 monitors the voltage, current and temperature of the battery 180 and warns a user of an abnormal event, if any. In addition, the battery monitoring system 190 calculates a state of charge (SOC) and a state of health (SOH) of the battery 180, performs cell balancing to make voltages or capacities of battery cells, and controls a cooling fan (not shown) to prevent the battery 180 from overheating.

The bi-directional converter 200 converts the DC power supplied from the DC link 130 into a different level DC power suitable to the battery 180. Conversely, the bi-directional converter 200 converts the DC power supplied from the battery 180 into a different level DC power suitable to the DC link 130.

The combined controller 210 monitors and controls the MPPT converter 120, the inverter 140, the system relay 160, and the bi-directional converter 200. In addition, the combined controller 210 communicates with the battery monitoring system 190 to monitor the battery monitoring system 190. The combined controller 210 senses the voltage, current and temperature of the MPPT converter 120, the inverter 140, the system relay 160, and the bi-directional converter 200, and controls the MPPT converter 120, the inverter 140, the system relay 160, and the bi-directional converter 200, respectively. In addition, the combined controller 210 may interrupt a breaker 155 installed between the load 150 and the system relay 160 in an emergency.

Figure 2:
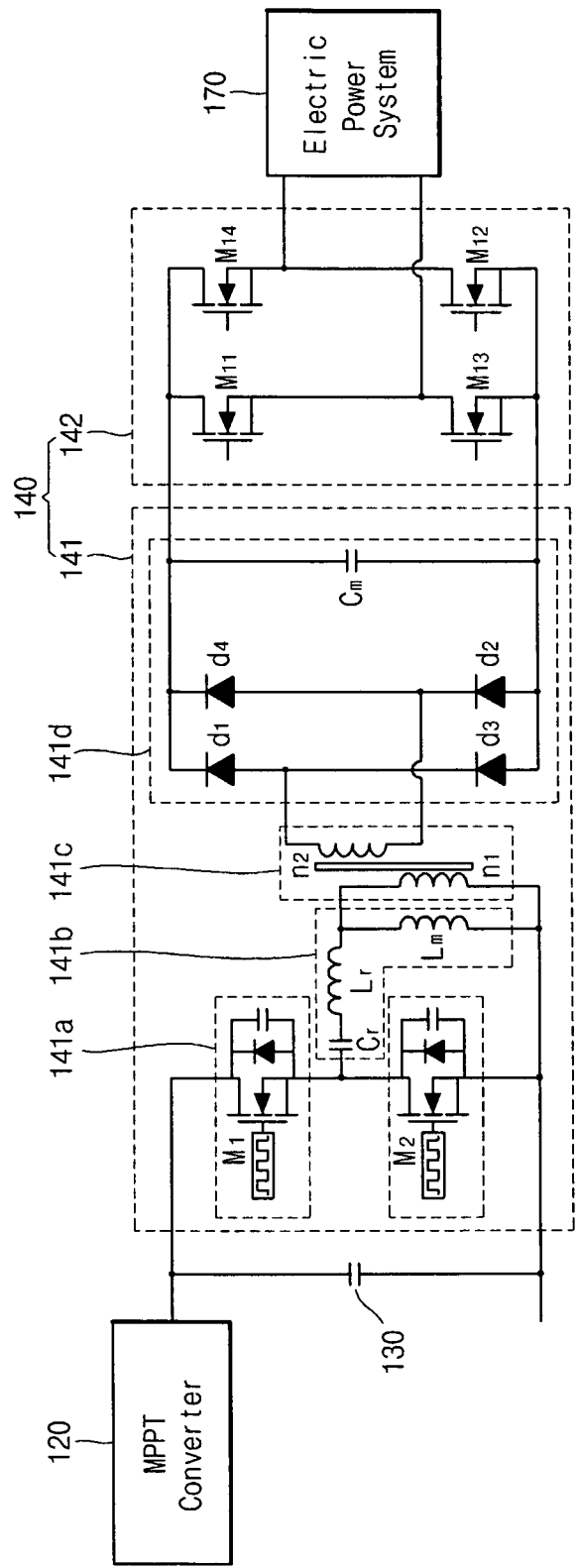
FIG. 2 illustrates a block diagram of an inverter of the renewable energy storage system shown in FIG. 1.

FIG. 2 illustrates a block diagram of the inverter 140 of the renewable energy storage system 100 shown in FIG. 1 according to an embodiment. As shown in FIG. 2, the inverter 140 of the renewable energy storage system 100, which supplies the power of the DC link 130 to the electric power system 170, may include a DC-DC converting unit 141 and a DC-AC inverting unit 142.

The DC-DC converting unit 141 converts the power of the DC link 130 into a different level DC power and outputs the same to the DC-AC inverting unit 142. The DC-DC converting unit 141 may be an unregulated DC-DC bus converter. In other words, the DC-DC converting unit 141 has a duty cycle and an operating frequency that are not regulated. In an exemplary embodiment, the DC-DC converting unit 141 is an unregulated converter and operates with a fixed duty cycle of approximately 50% and a fixed operating frequency. For reference, a regulated DC-DC bus converter is a converter having a duty cycle and an operating frequency varying with the condition of load.

The DC-DC converting unit 141 may include a half-bridge switch 141a, an oscillator 141b, an insulating transformer 141c, and a full-bridge diode rectifier 141d.

The half-bridge switch 141a may include a first switch M1 connected to a first electrode of the DC link 130 and a second switch M2 connected to a second electrode of the DC link 130. The first switch M1 and the second switch M2 may be any one selected from a general metal oxide semiconductor field effect transistor (MOSFET) or insulated gate bipolar transistor (IGBT), and equivalents thereof.

The first switch M1 has a first electrode connected to the first electrode of the DC link 130. In addition, the first switch M1 has a second electrode connected to a first electrode of the second switch M2. In addition, the first switch M1 applies a control signal with a fixed duty cycle of approximately 50% through its control electrode. The second switch M2 has the first electrode connected to the second electrode of the first switch M1. In addition, the second switch M2 has a second electrode connected to the second electrode of the DC link 130. Further, the second switch M2 applies a control signal with a fixed duty cycle of approximately 50% through its control electrode.

When the first switch M1 is turned on, the second switch M2 is turned off. In addition, when the first switch M1 is turned off, the second switch M2 is turned on. Thus, the first switch M1 and the second switch M2 operate in a complementary manner and output the energy of the DC link 130. In addition, as described above, the first switch M1 and the second switch M2 are unregulated switches and operate with a fixed duty of approximately 50% and a fixed operating frequency, thereby positively ensuring zero-voltage switching (ZVS).

The oscillator 141b may include an input capacitor Cr, a first inductor Lr, and a second inductor Lm. The input capacitor Cr has a first electrode connected to the second electrode of the first switch M1 and the first electrode of the second switch M2. In addition, the input capacitor Cr has a second electrode connected to a first electrode of the first inductor Lr, which will be described below. The first inductor Lr has a first electrode connected to the second electrode of the input capacitor Cr. In addition, the first inductor Lr has a second electrode connected to a first electrode of the second inductor Lm. The second inductor Lm has a first electrode connected to the second electrode of the first inductor Lr. The second inductor Lm has a second electrode connected to the second electrode of the DC link 130. In such a manner, the oscillator 141b oscillates the power output from the half-bridge switch 141a and outputs the oscillated power.

The insulating transformer 141c may include a primary turn n1 and secondary turn n2. The primary turn n1 has a first electrode connected to the second electrode of the first inductor Lr and the first electrode of the second inductor Lm. In addition, the primary turn n1 has a second electrode connected to the second electrode of the DC link 130, the second electrode of the second switch M2, and the second electrode of the second inductor Lm. The secondary turn n2 is insulated from the primary turn n1 and is connected to the full-bridge diode rectifier 141d. In such a manner, the insulating transformer 141c has the primary turn n1 and the secondary turn n2 that are electrically insulated, and delivers the power of the DC link 130 from the primary turn n1 to the secondary turn n2. Of course, the insulating transformer 141c outputs the power depending on a turn ratio of the primary turn n1 and the secondary turn n2.

The full-bridge diode rectifier 141d may include four diodes d1-d4 and one output capacitor Cm. A first diode d1 has a first electrode connected to the first electrode of the secondary turn n2 and a second electrode of a third diode d3, and a second electrode connected to a second electrode of a fourth diode d4 and a first electrode of the output capacitor Cm. A second diode d2 has a first electrode connected to a first electrode of the third diode d3 and a second electrode of the output capacitor Cm, and a second electrode connected to the second electrode of the second turn n2 and a first electrode of the fourth diode d4. The third diode d3 has a first electrode connected to the first electrode of the second diode d2 and the second electrode of the output capacitor Cm, and a second electrode connected to the first electrode of the first diode d1 and the first electrode of the secondary turn n2. The fourth diode d4 has the first electrode connected to the second electrode of the second diode d2 and the second electrode of the secondary turn n2, and the second electrode connected to the second electrode of the first diode d1 and the first electrode of the output capacitor Cm.

The output capacitor Cm has the first electrode connected to the second electrode of the first diode d1 and the second electrode of the fourth diode d4, and a second electrode connected to the first electrode of the second diode d2 and the first electrode of the third diode d3. In addition, the first and second electrodes of the output capacitor Cm are connected to the DC-AC inverting unit 142. In such a manner, the full-bridge diode rectifier 141d outputs a voltage in the form of a half-wave rectified sine wave of a constant level to the DC-AC inverting unit 142.

The DC-AC inverting unit 142 may be a full-bridge switch having four switches M11-M14. A first switch M11 through a fourth switch M14 may be any one selected from a general metal oxide semiconductor field effect transistor (MOSFET) or insulated gate bipolar transistor (IGBT), and equivalents thereof.

The first switch M11 has a first electrode connected to the first electrode of the output capacitor Cm and a first electrode of the fourth switch M14, and a second electrode connected to a first electrode of a third switch M13 and the electric power system 170. The second switch M12 has a first electrode connected to a second electrode of the fourth switch M14 and the electric power system 170, and a second electrode connected to a second electrode of the third switch M13 and the second electrode of the output capacitor Cm. The third switch M13 has the first electrode connected to the second electrode of the first switch M11 and the electric power system 170, and the second electrode connected to the second electrode of the output capacitor Cm and the second electrode of the second switch M12. The fourth switch M14 has the first electrode connected to the first electrode of the first switch M11, and the second electrode connected to the first electrode of the second switch M12 and the electric power system 170.

In such a manner, the DC-AC inverting unit 142 synchronizes the half-wave rectified sine wave output from the DC-DC converting unit 141 with a voltage of the electric power system 170, and outputs the synchronized wave to the electric power system 170. The duty cycle and operating frequency of each of the first switch M11 through the fourth switch M14 forming the DC-AC inverting unit 142 may be controlled by a combined controller (210 of FIG. 1) so as not to change the voltage of the DC link 130. As it is well known to one skilled in the art how to control the duty and operating frequency of each of the first switch M11 through the fourth switch M14 for preventing the voltage of the DC link 130 from being changed, a detailed description will be omitted.

In an embodiment, the inverter 140 having the aforementioned construction operates as follows.

In the DC-DC converting unit 141, first, the half-bridge switch 141a operates. That is to say, the first switch M1 and the second switch M2 operate with a fixed duty of approximately 50% and a fixed operating frequency. In other words, the first switch M1 and the second switch M2 are controlled in an unregulated manner. For example, when the first switch M1 is turned on, the second switch M2 is turned off. When the first switch M1 is turned off, the second switch M2 is turned on. Since the first switch M1 and the second switch M2 are controlled with a fixed duty cycle of approximately 50%, the first switch M1 and the second switch M2 are definitely switched by zero-voltage switching (ZVS).

The aforementioned operation of the half-bridge switch 141a allows the oscillator 141b to be operable. In an exemplary embodiment, when the first switch M1 is turned on, a voltage applied between the first and second electrodes of the first switch M1 approaches 0 V and a voltage of the input capacitor Cr gradually increases. In addition, a current flowing through the first inductor Lr considerably increases and then slightly decreases until it reaches a constant level. Further, a current flowing through the second inductor Lm gradually increases and then reaches a constant level.

In addition, when the first switch M2 is turned off, a voltage applied between the first and second electrodes of the first switch M1 increases, while a voltage of the input capacitor Cr gradually decreases. In addition, a current flowing through the first inductor Lr considerably decreases and then slightly increases until it reaches a constant level. In addition, a current flowing through the second inductor Lm gradually decreases and then reaches a constant level.

The transformer 141c supplies the energy corresponding to a turn ratio of the primary turn n1 to the secondary turn n2 to the full-bridge diode rectifier 141d. Here, the voltage output from the transformer 141c is an AC voltage. The full-bridge diode rectifier 141d, i.e., the first through fourth diodes d1-d4 and the output capacitor Cm, output voltages in half-wave rectified sine wave forms.

Finally, the DC-AC inverting unit 142, i.e., the first through fourth switches M11-M14, controls the voltage in the half-wave rectified sine wave forms to have the same phase as the voltage of the electric power system 170, and outputs the controlled voltage to the electric power system 170.

Figure 3:
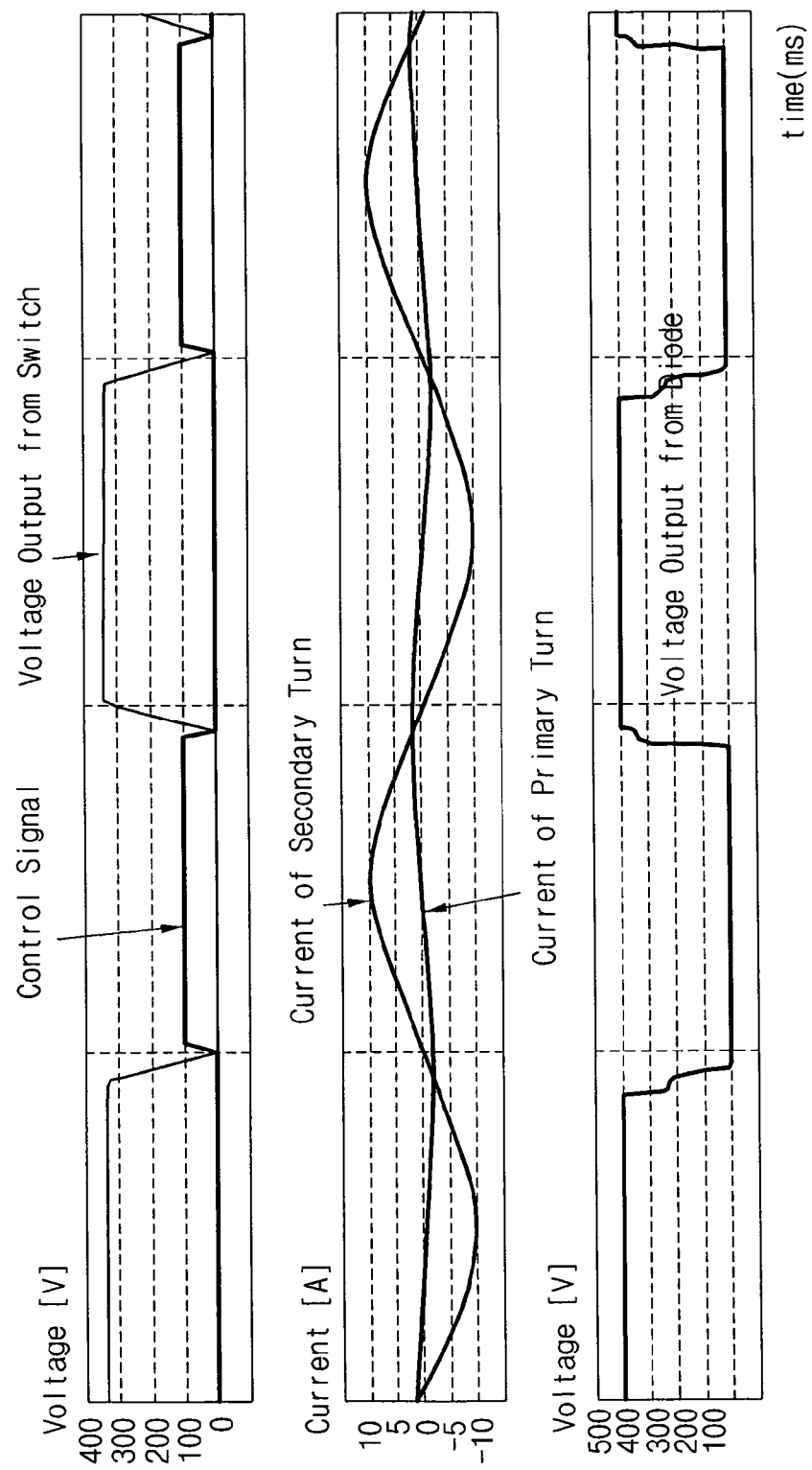
FIG. 3 illustrates primary waveforms of the inverter shown in FIG. 2.

FIG. 3 illustrates a waveform diagram of primary waveforms of the inverter 140 shown in FIG. 2.

As shown in FIG. 3, for example, a control signal applied to a control electrode of the first switch M1 is turned on after the voltage at either end of the first switch M1 becomes approximately 0 V. Therefore, the DC-DC converting unit 141 positively ensures ZVS. In addition, since the first switch M11 and the second switch M2 operate in a complementary manner, ZVS of the second switch M2 is also positively ensured.

In addition, a current applied to the primary turn n1 of the insulating transformer 141c is relatively small and gradually changes, while a current output from the secondary turn n2 is relatively large and rapidly changes.

The voltage output from the full-bridge diode rectifier 141d has substantially the same wave form as the voltage applied to the first switch M1.

Figure 4A:
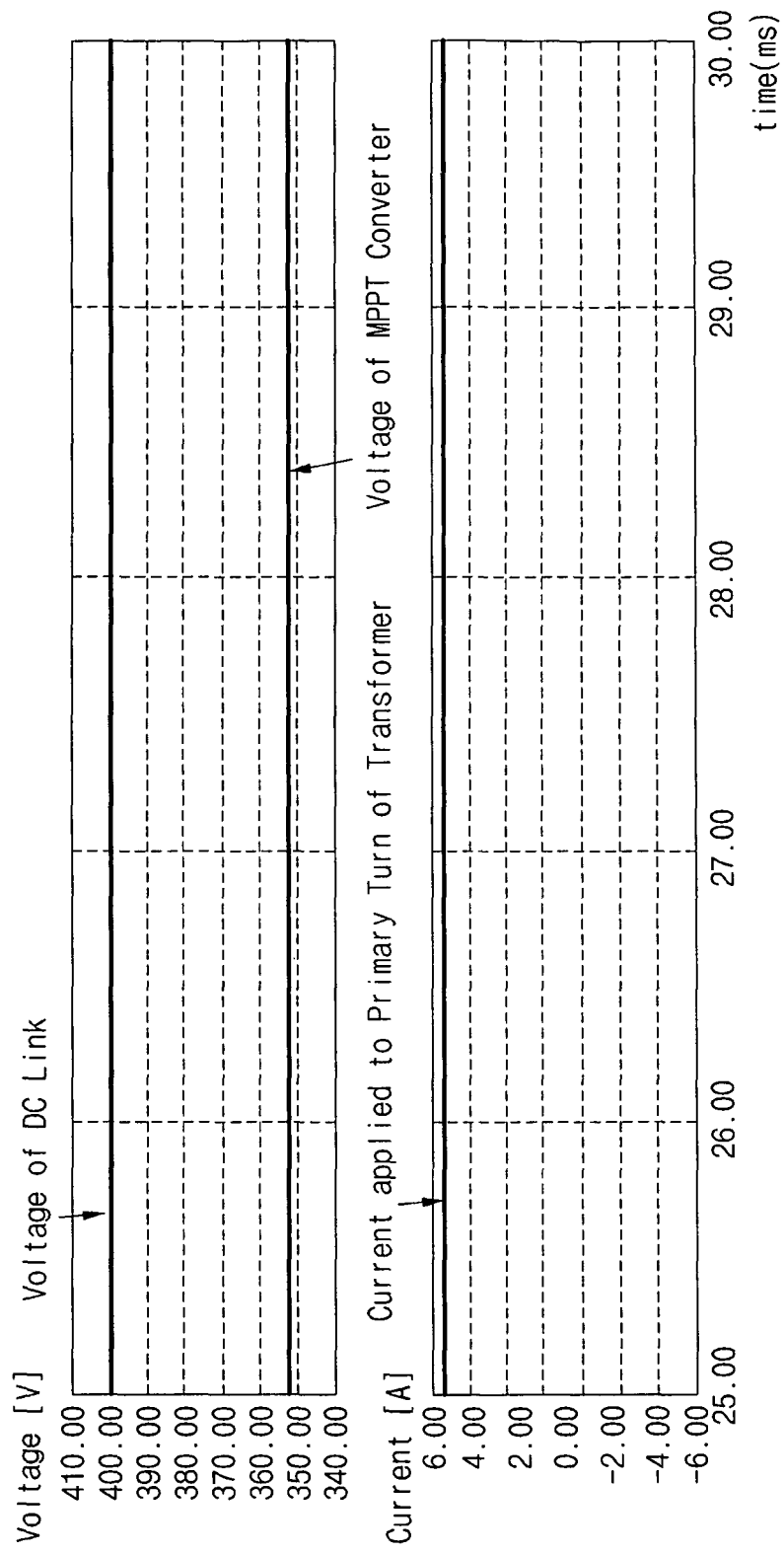
FIGS. 4A, 4B, and 4C illustrate graphs voltages of a maximum power point tracking converter and a DC link, and of a current applied to a primary turn of a transformer based on power generated from renewable energy in the inverter shown in FIG. 2.
Figure 4B:
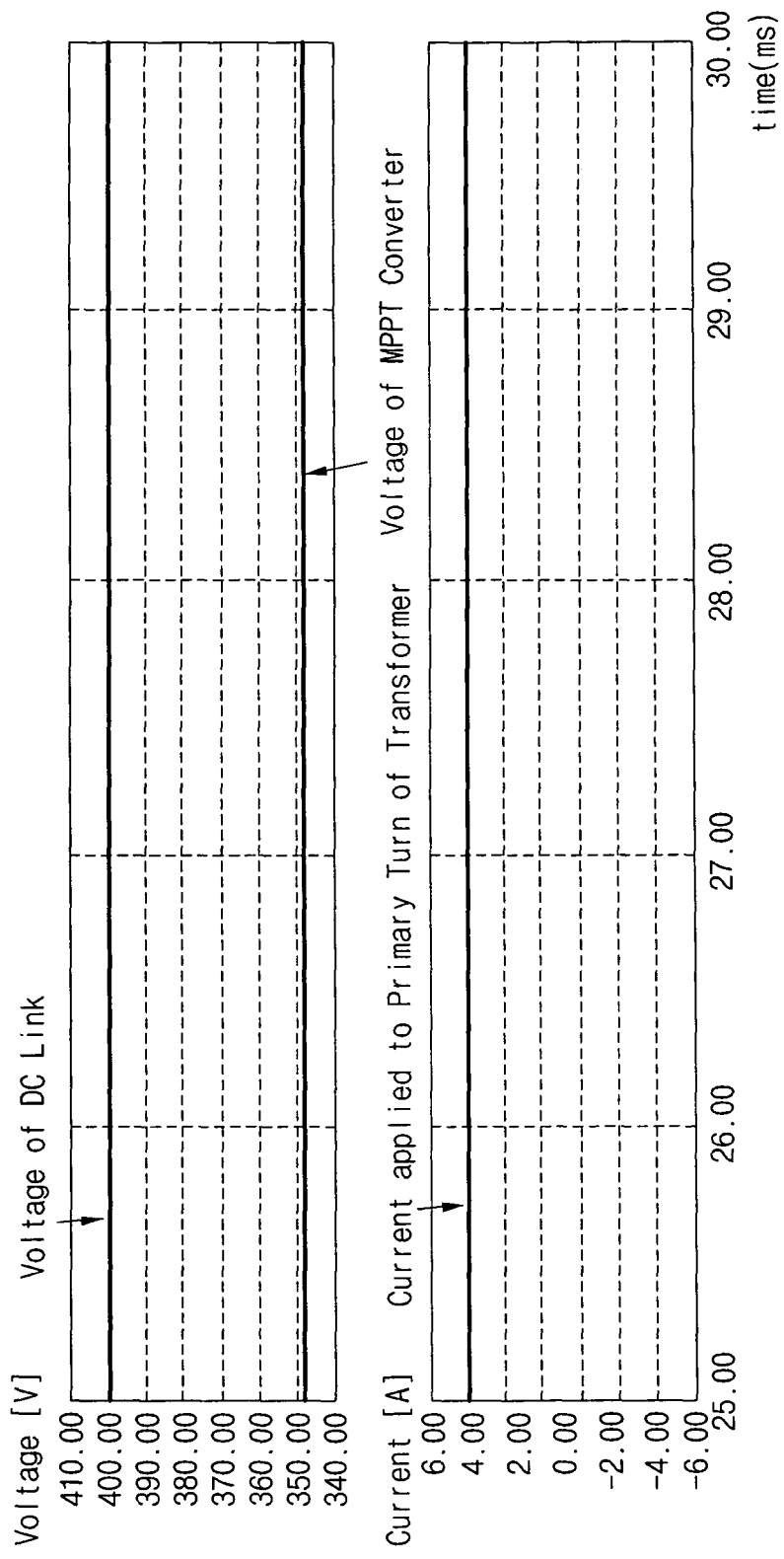
Figure 4C:
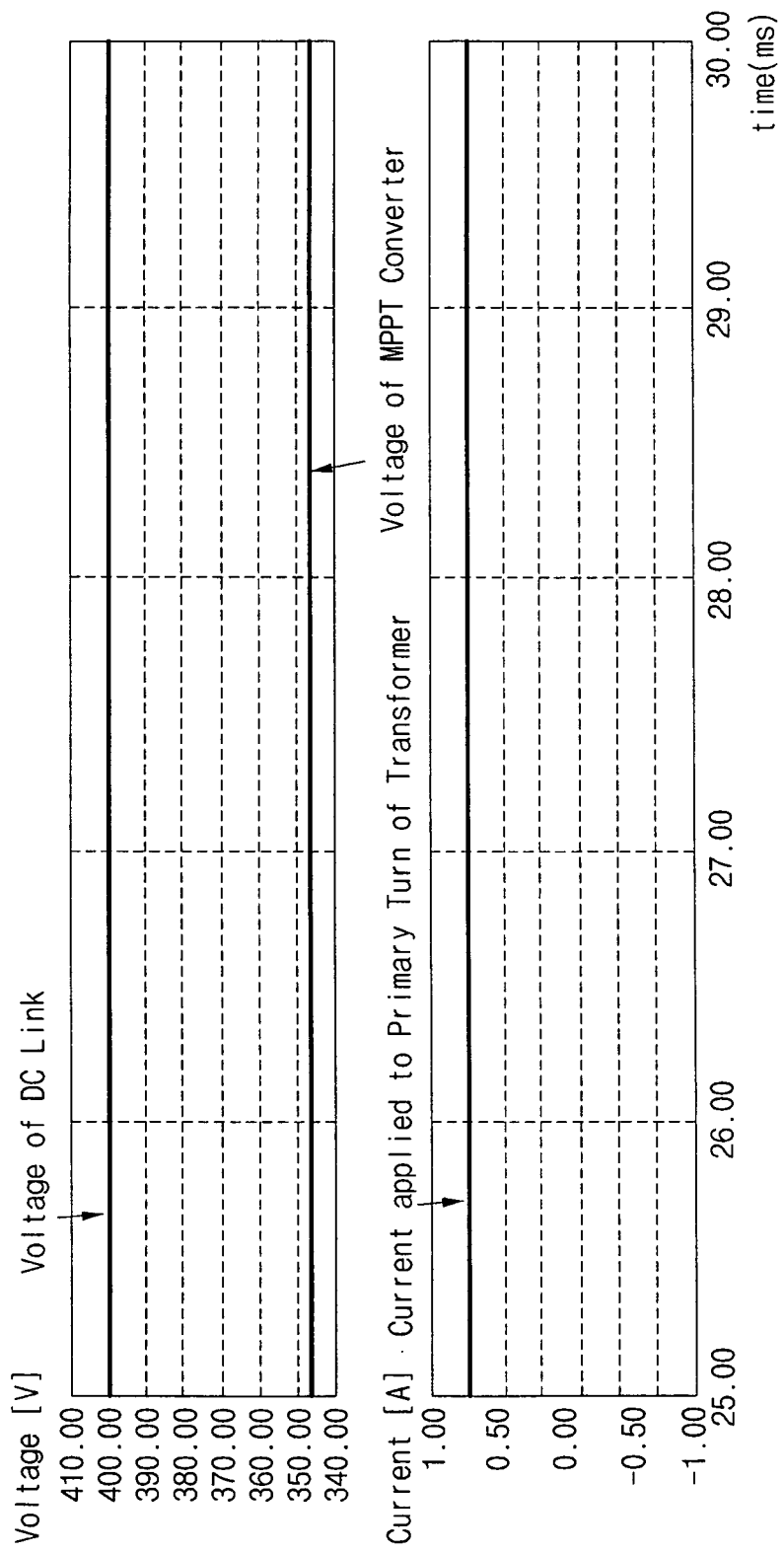

FIGS. 4A, 4B, and 4C illustrate graphs of voltages of the MPPT converter 120 and the DC link 130, and of a current applied to the primary turn n1 of the transformer 141c based on power generated from renewable energy in the inverter 140 shown in FIG. 2.

FIG. 4A illustrates a case where the power generated from renewable energy is approximately 1 kW. FIG. 4B illustrates a case where the power generated from renewable energy is approximately 350 W. FIG. 4C illustrates a case where the power generated from renewable energy is approximately 70 W.

As shown in FIG. 4A, when the power generated from renewable energy is approximately 1 kW, the voltage of the DC link 130, applied to the DC-AC inverting unit 142 as an input that is indirectly controlled, is controlled to approximately 400 V by the DC-AC inverting unit 142, so that the voltage output from the MPPT converter 120, applied to the DC-DC converting unit 141 as an input, is maintained at approximately 352 V.

As shown in FIG. 4B, when the power generated from renewable energy is approximately 350 W, the voltage of the DC link 130, applied to the DC-AC inverting unit 142 as an input that is indirectly controlled, is controlled to approximately 400 V by the DC-AC inverting unit 142, so that the voltage output from the MPPT converter 120, applied to the DC-DC converting unit 141 as an input, is maintained at approximately 348 V.

As shown in FIG. 4C, when the power generated from renewable energy is approximately 70 W, the voltage of the DC link 130, applied to the DC-AC inverting unit 142 as an input that is indirectly controlled, is controlled to approximately 400 V by the DC-AC inverting unit 142, so that the voltage output from the MPPT converter 120, applied to the DC-DC converting unit 141 as an input, is maintained at approximately 345 V.

As described above, even if the power generated from the renewable energy is greatly changed from approximately 1 kW to approximately 70 W, the voltage output from the MPPT converter 120 only slightly changes, e.g., by approximately 7 V. Therefore, it is confirmed that an unregulated DC-DC bus converter, which is not necessarily separately controlled, may be used as the DC-DC converting unit 141. Further, while the voltage of the DC link is maintained at approximately 400 V for all levels of power generated from the renewable energy, the current applied to the primary turn of the transformer decreases with decreasing power.

In such a manner, the inverter 140 of a renewable energy storage system according to an embodiment has the DC-DC converting unit 141, such as an unregulated DC-DC bus converter, between the DC link 130 and the DC-AC inverting unit 142. Here, the DC-DC converting unit 141 operates with a fixed duty cycle of approximately 50% and a fixed operating frequency while insulating an input port and an output port, there is no current circulating section at an input port existing due to a variation in the input voltage. Accordingly, the inverter 140 of a renewable energy storage system according to an embodiment has a small conduction loss and less heat generated, while improving system efficiency.

In addition, in the inverter 140 of a renewable energy storage system according to the embodiment, zero-voltage switching (ZVS) is ensured in a low load condition, thereby reducing a switching loss. That is to say, since the zero-voltage switching (ZVS) operation of the first switch M1 and the second switch M2 of the DC-DC converting unit 141 are ensured, a stable operation is achieved even under a condition in which the load severely changes. Accordingly, in view of efficiency, the inverter 140 of a renewable energy storage system according to an embodiment of the present invention has a small circulating current and a low power peak of switches when the first switch M1 and the second switch M2 are turned off, a turn-off switching loss is lowered.

Further, since the inverter 140 of a renewable energy storage system according to the above described embodiment of the present invention has a small circulating current, the size of the DC-DC converting unit 141 can be minimized by driving the same with a high frequency of approximately 100 kHz or greater. In addition, since the DC-DC converting unit 141 is an unregulated converter, the circuit becomes simplified. Further, since the voltage of the DC link 130 is reduced to approximately 450 V or less, a common capacitor can be used.

Further, since the inverter 140 of a renewable energy storage system according to the embodiment employs the DC-DC converting unit 141, such as an unregulated DC-DC converter, an output inductor may be eliminated and only the insulation-type transformer 141c as a reactive element is provided, thereby simplifying the circuitry and making the system configuration less bulky.

Exemplary embodiments of the inverter of a new and renewable energy storage system have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A renewable energy storage system for a renewable energy source, the renewable energy storage system comprising:
   a maximum power point tracking (MPPT) converter connected to the renewable energy source;
   a DC link connected to the MPPT converter;
   a DC-DC converting unit connected to the DC link; and an inverting unit connected to the DC-DC converting unit, wherein the DC-DC converting unit includes:
: a half-bridge circuit including first and second unregulated switches;
an oscillator that oscillates power output from the half-bridge circuit, and
a transformer that converts power from the oscillator into power of a different level, wherein the first and second switches are complementary switches that operate based on a duty cycle and an operating frequency that are substantially fixed;
wherein the MPPT converter extracts maximum available power from the new renewable energy and provides an output voltage that varies less than 10% for a predetermined operational power range of the renewable energy source, and wherein the output voltage of the DC link remains substantially constant in the predetermined operation range of the renewable energy source.

2. The renewable energy storage system as claimed in claim 1, wherein the first and second switches of the half-bridge circuit in the DC-DC converting unit operate with a fixed duty cycle of 50%.

3. The renewable energy storage system as claimed in claim 1, wherein the DC-DC converting unit comprises: a full-bridge diode rectifier that rectifies the converted power output from the transformer into DC power and outputs the rectified power.

4. The renewable energy storage system as claimed in claim 3, wherein:
the first switch is connected to a first electrode of the DC link; and
the second switch is connected to the first switch and a second electrode of the DC link.

5. The renewable energy storage system as claimed in claim 3, wherein the oscillator comprises:
an input capacitor connected to the half-bridge circuit;
a first inductor connected to the input capacitor; and
a second inductor connected to first inductor and the DC link.

6. The renewable energy storage system as claimed in claim 5, wherein the transformer comprises:

a primary coil connected in parallel to the second inductor; and
a secondary coil insulated from the primary coil.

7. The renewable energy storage system as claimed in claim 3, wherein the fixed duty cycle is 50%.

8. The renewable energy storage system as claimed in claim 3, wherein the inverting unit includes a full-bridge switch connected to the DC-DC converting unit.

9. The renewable energy storage system as claimed in claim 1, wherein the inverting unit includes a full-bridge switch connected to the DC-DC converting unit.

10. The renewable energy storage system as claimed in claim 1, wherein the DC-DC converting unit is coupled to receive electric energy produced from a solar cell, a wind power generator, a geothermal generator, or a tidal power generator.

11. The renewable energy storage system as claimed in claim 1, wherein the first and second switches are controlled to perform zero voltage switching.

12. The renewable energy storage system as claimed in claim 1, wherein the predetermined operational range of the renewable energy source includes 70 W to 1 kW.

13. The renewable energy storage system as claimed in claim 1, wherein a ratio of the predetermined operational range of the renewable energy source to the voltage output from the MPPT is approximately 130.

14. The renewable energy storage system as claimed in claim 1, wherein the MPPT converter provides an output voltage that varies approximately 2%.

15. The renewable energy storage system as claimed in claim 1, wherein a circulating current is suppressed at an input port of the inverting unit as a result of the output voltage of the MPPT varying approximately 2% for the predetermined operational power range of the renewable energy source.

16. The renewable energy storage system as claimed in claim 1, wherein the MPPT converter provides an output voltage that varies less than 5%.

* * * * *